(12) United States Patent
Butler et al.

(10) Patent No.: US 7,073,267 B2
(45) Date of Patent: Jul. 11, 2006

(54) GAUGING APPARATUS AND METHOD

(76) Inventors: Ronald T. Butler, 2135 St. James Dr., Santa Barbara, CA (US) 93105; Alan Georgeff, 1103 Lawrence Dr., Newbury Park, CA (US) 91720

( * ) Notice: Subject to any disclaimer, the term of this patent is extended or adjusted under 35 U.S.C. 154(b) by 0 days.

(21) Appl. No.: 10/729,289

(22) Filed: Dec. 8, 2003

(65) Prior Publication Data

US 2005/0120569 A1    Jun. 9, 2005

(51) Int. Cl.
*G01B 5/20* (2006.01)
(52) U.S. Cl. ............... 33/203; 33/203.18; 33/464; 33/600
(58) Field of Classification Search ............... 33/464, 33/452, 203, 203.18, 203.19, 203.2, 203.21, 33/600, 608
See application file for complete search history.

(56) References Cited

U.S. PATENT DOCUMENTS

| 70,547 | A | * | 11/1867 | Graham | 33/452 |
| 307,321 | A | * | 10/1884 | Osborn | 33/464 |
| 603,782 | A | * | 5/1898 | Brown | 33/203.19 |
| 1,245,213 | A | * | 11/1917 | Gammeter | 33/203 |
| 1,324,388 | A | * | 12/1919 | Duby | 33/203.2 |
| 2,000,865 | A | * | 5/1935 | Smith et al. | 33/337 |
| 3,101,553 | A | * | 8/1963 | Rish | 33/203.18 |
| 3,135,052 | A | * | 6/1964 | MacMillan | 33/203.2 |
| 3,305,936 | A | * | 2/1967 | Dent | 33/203.17 |
| 4,271,599 | A | * | 6/1981 | Pavitt | 33/203.18 |
| RE33,302 | E | * | 8/1990 | Mason | 33/203.18 |
| 5,412,878 | A | * | 5/1995 | Edman | 33/203 |
| 5,617,642 | A | * | 4/1997 | Marios | 33/452 |
| 6,035,729 | A | * | 3/2000 | Weinmann | 33/203 |

FOREIGN PATENT DOCUMENTS

| DE | 3902337 C1 | * | 5/1990 |
| GB | 2176618 A | * | 12/1986 |
| JP | 63165705 A | * | 7/1988 |

* cited by examiner

*Primary Examiner*—Diego Gutierrez
*Assistant Examiner*—Travis Reis
(74) *Attorney, Agent, or Firm*—William W. Haefliger

(57) ABSTRACT

A multiple gauge assembly for establishing vehicle wheel rim and tire sizes to prevent interference with vehicle structure facing the wheel, as during directional turning of the wheel on a vehicle wheel mount, about a pivot axis angled relative to the wheel axis, comprising a first adjustable gauge to establish a rim edge radial dimension, from the wheel axis, a second adjustable gauge to establish a rim offset (back spacing) dimension in a direction generally parallel to the wheel axis, and a third adjustable gauge to establish a tire peripheral dimension generally parallel to the wheel axis, whereby clearance between the wheel and vehicle structure can be predictively ascertained, as during wheel turning, prior to installation of the wheel on the mount.

9 Claims, 6 Drawing Sheets

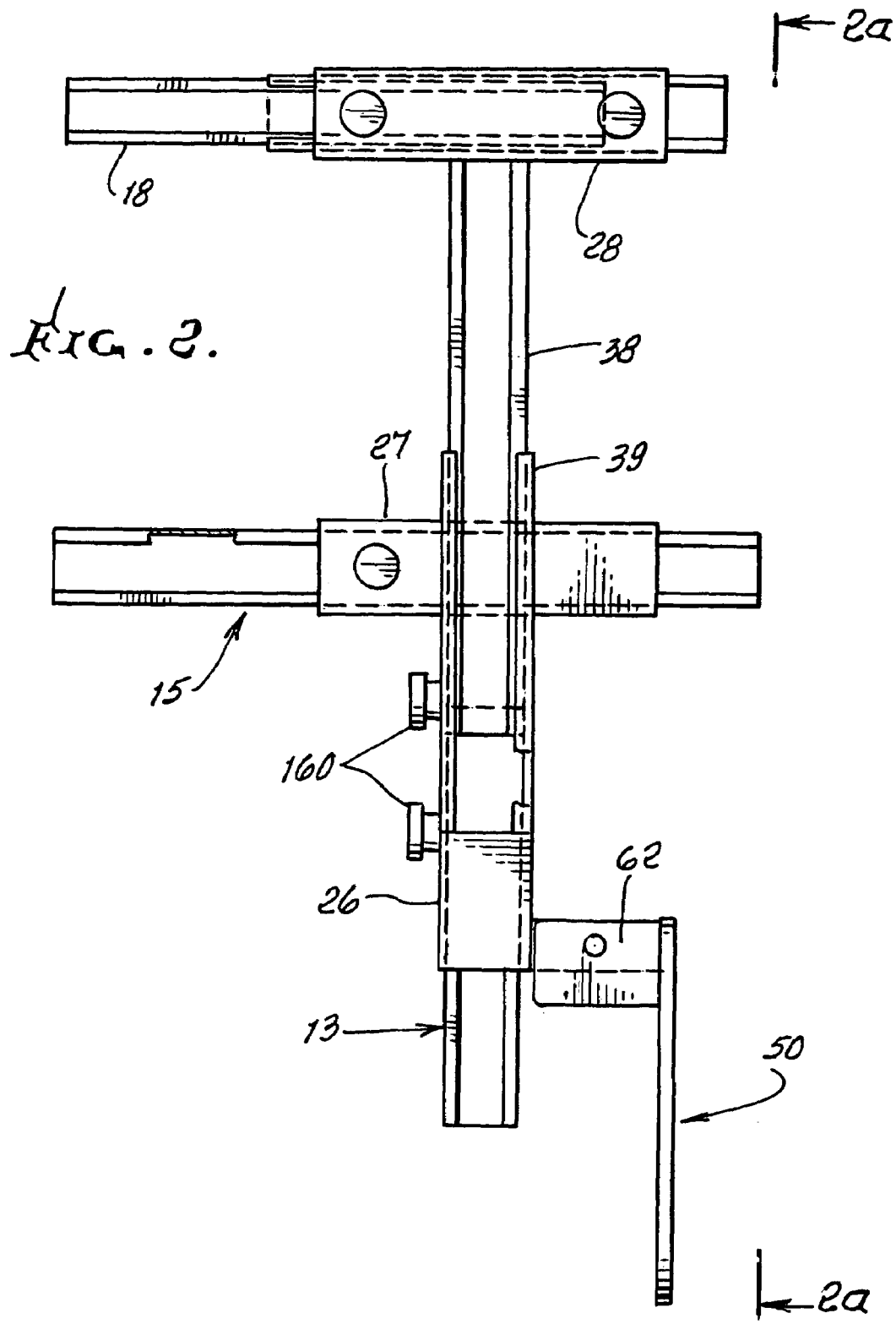

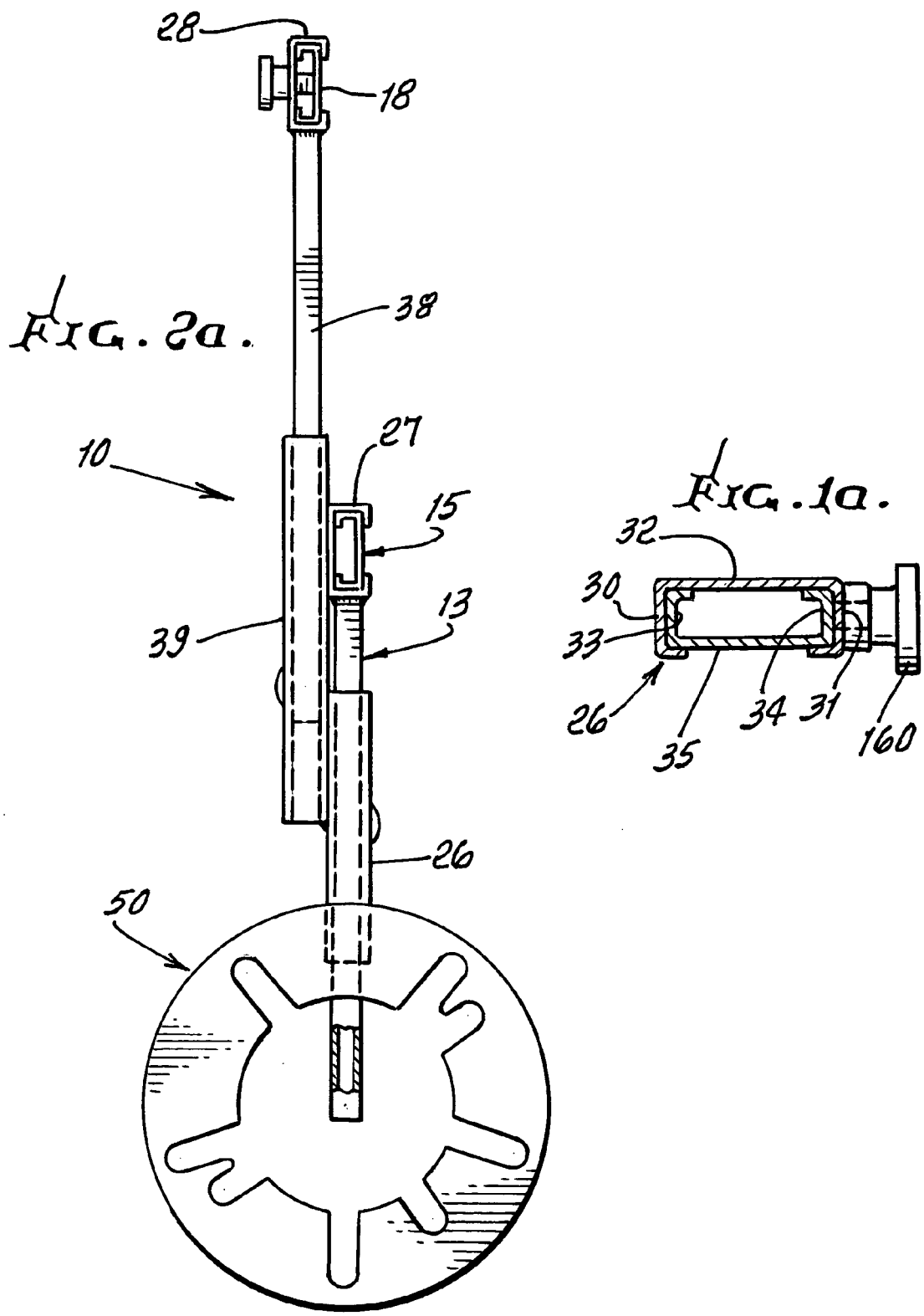

GAUGING APPARATUS AND METHOD

BACKGROUND OF THE INVENTION

This invention relates generally to accurate selection and installation of vehicle wheels and tires, and more specifically concerns provision of apparatus and methods to achieve such selection and installation, rapidly and accurately.

In the past, vehicle tires, installed on metallic wheels, were selected by visually estimating the sizes of tires and wheels to be installed. Generally this required installation of a series of wheels and tires, until a satisfactory fit of a wheel and tire to the vehicle wheel well space was achieved. Such procedures were inefficient, time consuming and required time and labor to mount several wheels, with different tires until the desired result was achieved. The problems included interference, or potential interference, of oversize tires with fenders and fender edges, particularly during wheel turning, and interference with vehicle structure, such as struts, shock absorbers, tie rods, and other vehicle equipment facing the wheel well. The problems became acute when it was desired to install wide or larger size tires as on racing vehicles. No way was known to achieve the highly advantageous results and methods of wheel and tire size selection, as are now provided by the present invention.

SUMMARY OF THE INVENTION

It is a major object of the invention to provide apparatus and method to overcome the above referenced problems and difficulties. Basically, the apparatus of the invention includes provision of a multiple gauge assembly for establishing vehicle wheel rim and tire sizes to prevent interference with vehicle structure facing the wheel, as during directional turning of the wheel on a vehicle wheel mount, about a pivot axis normal to the wheel axis, comprises in combination:

a) a first adjustable gauge to establish a rim edge radial dimension, from that wheel axis, b) a second adjustable gauge to establish a rim offset or back spacing dimension in a direction generally parallel to the wheel axis, c) and a third adjustable gauge to establish a tire peripheral dimension generally parallel to said wheel axis, d) whereby clearance between the wheel and said vehicle structure can be predictively ascertained, as by gauge assembly manipulation, prior to installation of the wheel on the mount.

It is another object of the invention to provide the first gauge which is elongated in a first direction, second gauge elongation in a second direction, such first and second directions being mutually substantially perpendicular. The third gauge is typically elongated in a third direction substantially parallel to said second direction.

A further object is to provide for the assembly to include a first carrier supporting the first gauge for linear adjustable movement in said first direction, and a second carrier supporting the second gauge for linear adjustable movement in second direction. In this regard, the assembly may include a third carrier supporting the third gauge for linear adjustable movement in a third direction relative to the wheel axis. Further, the second direction is typically substantially perpendicular to the first direction, and the third direction is substantially parallel to said second direction.

Yet another object is to provide a gauge assembly in which the first, second and third gauges have sliding interconnection, with said first, second and third carriers, respectively.

An additional object is to provide a connector plate carrying the gauge assembly, and configured for bolt-on connection to the vehicle wheel mount. In this regard, the multiple carriers are rigidly carried by that connector plate, to project in directions accommodating shifting of three gauge sliders, and pivoting of all three shifted sliders with the wheel mount, to determine the existence and extents of gauge assembly clearance with respect to vehicle structure facing the wheel well, all prior to any need for wheel and tire mounting or installation to the wheel mount. The sliders may be shifted to assure sufficient clearances, and satisfactory wheel and tire sizes may then be rapidly and accurately determined from the shifted gauge slider positions.

The basic method of the invention includes provision of a gauge assembly, as referred to, its installation on a vehicle wheel mount, gauge slider shifting to assure clearances as referred to, and readout of gauge slider positions.

These and other objects and advantages of the invention, as well as the details of an illustrative embodiment, will be more fully understood from the following specification and drawings, in which:

DRAWING DESCRIPTION

FIG. 1a is an enlarged section taken on lines 1a—1a of FIG. 1;

FIG. 2 is a rear elevation of the assembly of FIG. 1;

FIG. 2a is a side elevation taken on lines 2a—2a of FIG. 2;

DETAILED DESCRIPTION

Figure 5:
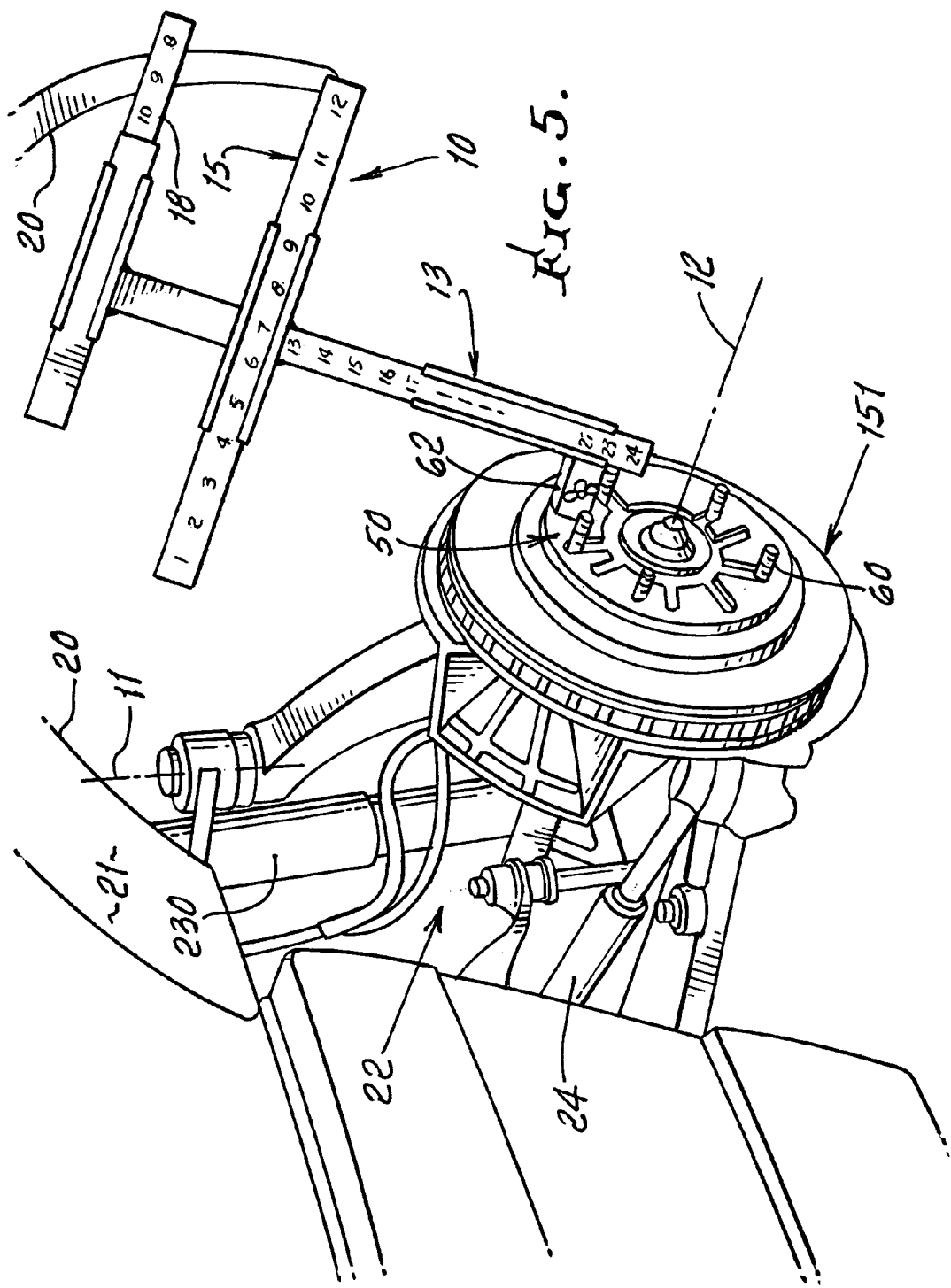
FIG. 5 is a perspective view showing installation of the adapter plate and gauge assembly onto a vehicle wheel mount, in a vehicle wheel well.

In the drawings, a preferred multiple gauge assembly is shown at 10 for establishing vehicle wheel rim and tire sizes to prevent interference with vehicle structure facing the wheel, as during directional turning of the wheel on a vehicle wheel mount, about a pivot axis 11 angled relative to the wheel axis 12. See pivot structure 11a in FIG. 5. The assembly includes:

a) a first adjustable gauge 13 to establish a rim edge radial dimension 14, from the wheel and wheel mount axis 12, b) a second adjustable gauge 15 to establish a rim offset (back spacing) dimension 16, relative to wheel mount 50, in a direction 17 generally parallel to the wheel axis, c) and a third adjustable gauge 18 to establish a tire peripheral radial dimension 19 relative to, and generally parallel to the wheel axis 12, d) whereby clearance between the wheel and said potentially interfering vehicle structure can be predictively ascertained, as during said wheel turning, prior to installation of the wheel on the mount.

Such vehicle structure may include the curved or projecting rim 20 of a vehicle fender 21 facing the wheel well, and structure 22 such as a shock absorber or absorbers 230, and/or a strut or struts or a tie rod or tie rods 24.

As shown, and with regard to the installed assembly, the first gauge 13 is elongated in a first direction 23 extending away from axis 12, and the second gauge 15 is elongated in a second direction indicated at 17, generally parallel to axis 12, said first and second directions being mutually perpendicular, or substantially perpendicular. The third gauge 18 is elongated in a third direction seen at 25, which is substantially parallel to second direction 17.

The assembly includes a first carrier 26 supporting the first gauge 13 for linear adjustable movement in direction or directions 23, and a second and transverse carrier 27 supporting the second gauge 15 for linear adjustable movement in a second direction 17. Carrier 26 is carried by mount 50 and carrier 27 is or may be carried by gauge 13, as shown. The assembly may also include a third carrier 28 carried by 13 and supporting the third gauge 18 for linear adjustable movement in third direction or directions 25. Carrier 28 is supported by vertical slide 38, slidable in a carrier 39 attached to 26, but not to 27. The carriers may be elongated as shown, and have like sides 30, 31 and 32, gauge edge guides 33, 34 and 35, and set screws 160 to clamp edge guides, and that may be loosened to allow gauge adjustment and tightening, to fix the gauges in selected positions. The carriers are operatively interconnected.

Figure 6:
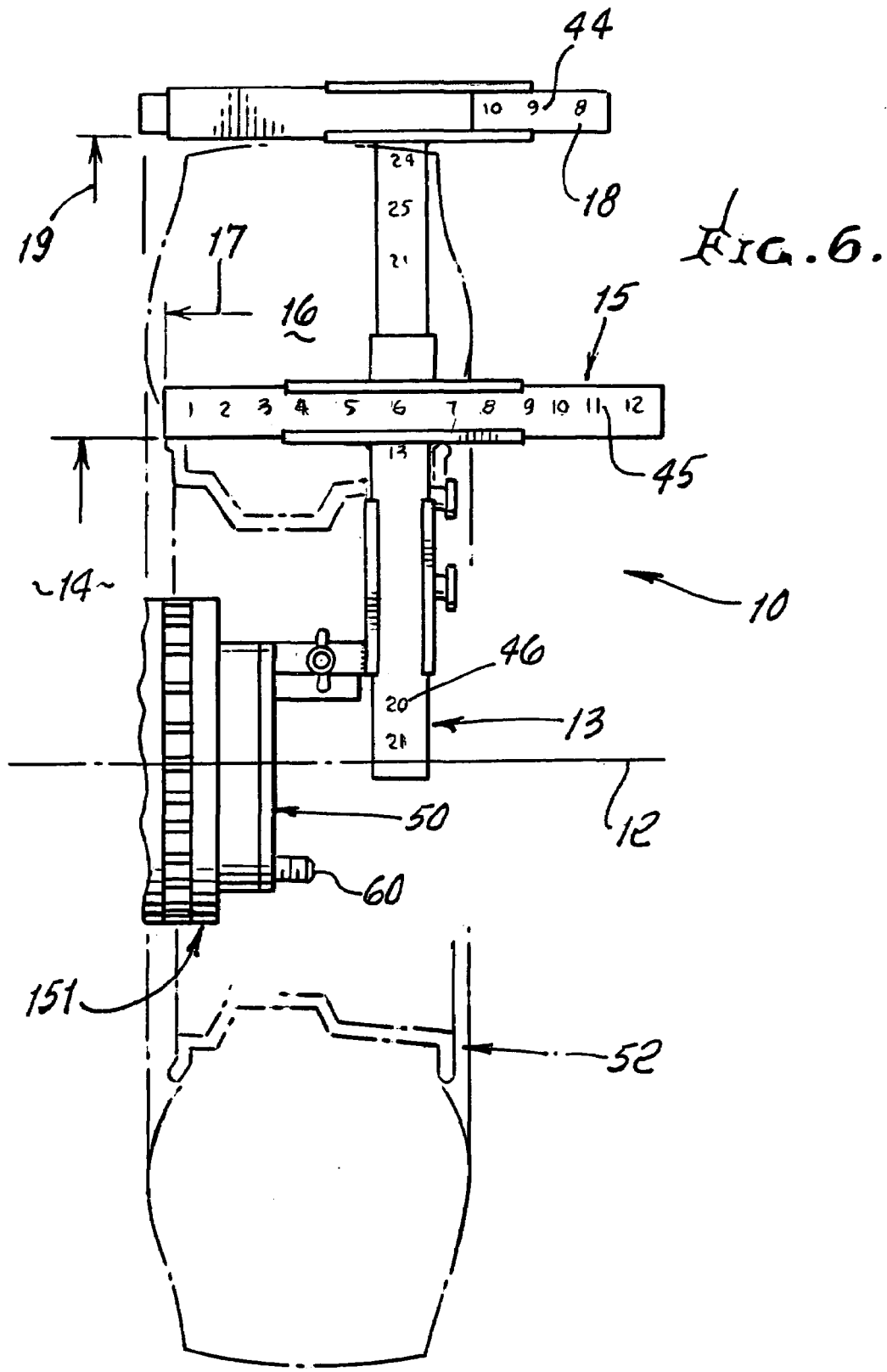
FIG. 6 is a schematic view showing correspondence between gauge settings and a vehicle wheel and tire, to be installed in mounted condition.

Note that the second direction is substantially perpendicular to said first direction, and the third direction is substantially parallel to said second direction; and the first, second and third gauges have sliding interconnection with the first, second and third carriers, respectively. The gauges have indicia thereon, as at 40, 41 and 42, that indicates dimensions corresponding to vehicle wheel and tire radial, rim offset (back spacing), and tire dimensions indicated at 44, 45 and 46 relatively, as in FIG. 6.

A connector plate 50 carries said assembly 10, and is configured for bolt-on connection to the vehicle wheel, hub or mount 51. Hub 51 is turnable with the mounted (selected) wheel 52, about axis 12. Mount 51 is also turnable with the wheel (by steering) about pivot axis 11 normal to axis 12.

Bolts 60 project from hub or mount 151 for attachment to the wheel 52, or to the connector plate 50.

Figure 1:
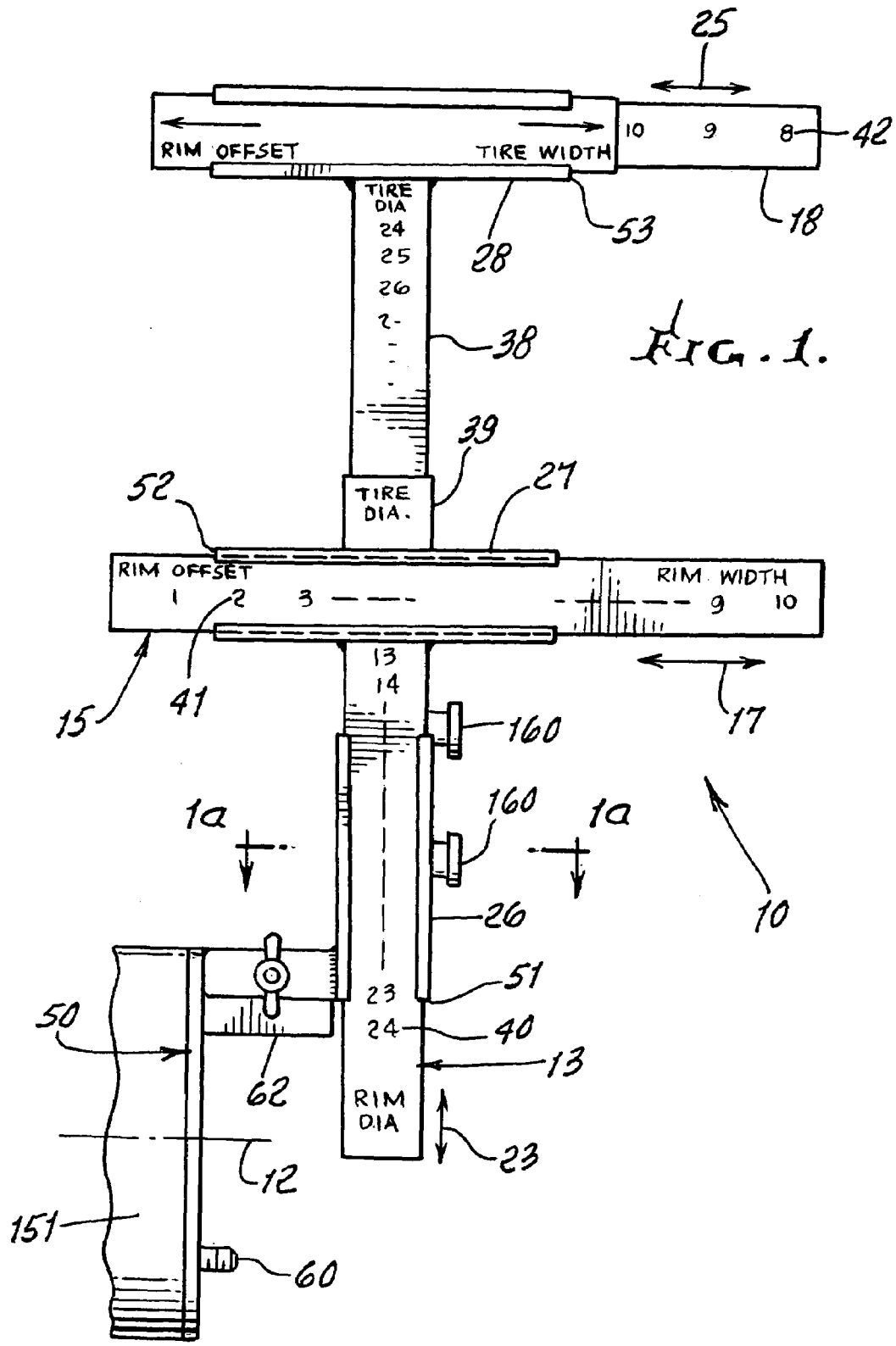
FIG. 1 is a frontal elevation of a multiple gauge assembly incorporating the invention.
Figure 3:
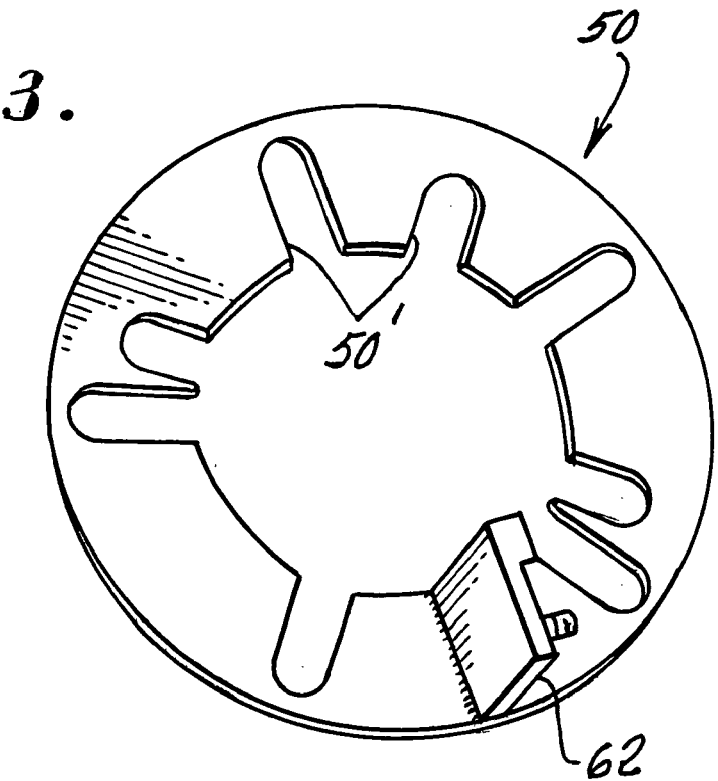
FIG. 3 is a perspective view of one form of adapter plate used to connect the FIG. 1 assembly to a vehicle wheel mount.
Figure 4:
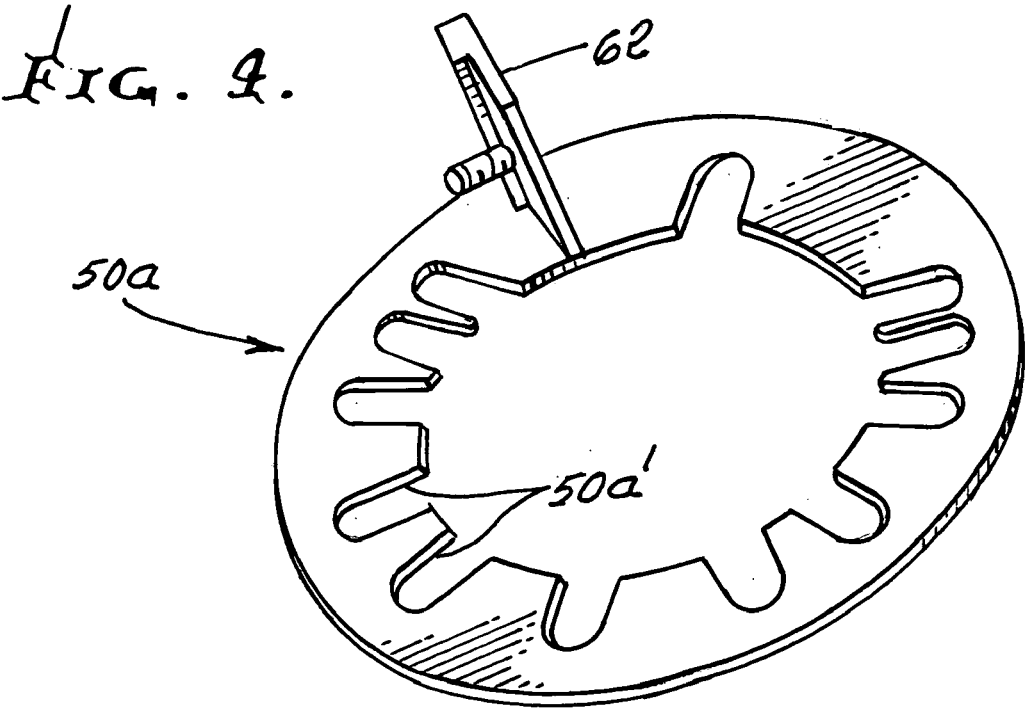
FIG. 4 is a view like FIG. 3, showing another form of adapter plate.

FIG. 3 shows connector plate 50, with openings 50' to pass bolts 60; and FIG. 4 shows an alternate plate 50a, with openings 50a' to pass bolts. A lug 62 projects from the plate.

Indicia on the gauges or sliders register with edges 151, 152 and 153 to indicate measurements.

We claim:

1. A multiple gauge assembly for establishing vehicle wheel rim and tire sizes to prevent interference with vehicle structure facing the wheel, as during directional turning of the wheel on a vehicle wheel mount, about a pivot axis angled relative to the wheel axis, comprising in combination:

a) a first adjustable gauge having gauge marks therealong to establish a rim edge radial dimension, from said wheel axis, b) a second adjustable gauge having gauge marks therealong to establish a rim offset or back spacing dimension in a direction generally parallel to the wheel axis, c) and a third adjustable gauge having gauge marks therealong to establish a tire peripheral dimension generally parallel to said wheel axis, d) whereby clearance between the wheel and said vehicle structure can be predictively ascertained, as during said wheel turning, prior to installation of the wheel on the mount, e) said assembly including a first carrier supporting said first gauge for linear adjustable movement in a first direction, and a second carrier supporting said second gauge for linear adjustable movement in a second direction, said second carrier rigidly supported by said first gauge for bodily movement in said first direction but not in said second direction, f) said first carrier slidably carrying said first gauge for vertical movement, g) and including a connector plate having lug projecting in a direction generally normal to the plate and connected to said first carrier along length thereof and at the level of said plate but in spaced relation to the plate and spaced below the second gauge for carrying said assembly, with a plane defined by the carriers extending normal to a plane defined by the connector plate, the plate having radially extending openings configured to pass bolts for bolt-on connection to said vehicle wheel mount, h) the first gauge being elongated in said first direction and extending proximate an end of the lug to travel past and proximate that lug end as the first gauge is moved in said first direction.

2. The combination of claim 1 wherein said second gauge is elongated in a second direction, said first and second directions being mutually perpendicular.

3. The combination of claim 2 wherein said third gauge is elongated in a third direction, said third direction being substantially parallel to said second direction.

4. The combination of claim 1 wherein said assembly includes a third carrier supporting said third gauge for linear adjustable movement in a third direction.

5. The combination of claim 4 wherein said second direction is substantially perpendicular to said first direction.

6. The combination of claim 5 wherein said third direction is substantially parallel to said second direction.

7. The combination of claim 4 wherein said carriers are operatively interconnected.

8. The combination of claim 4 wherein said first, second and third gauges have sliding interconnection with said first, second and third carriers, respectively.

9. The combination of claim 1 including said wheel mount to which said connector plate is connected by bolt-on connection, said mount turnable with the wheel about said pivot axis.

\* \* \* \* \*